No. 12,318. REISSUED FEB. 14, 1905.

T. S. LEESE.

LAMP.

APPLICATION FILED JAN. 5, 1905.

3 SHEETS—SHEET 1.

Witnesses:
E. R. Rodd.
Chas. S. Fifley

Inventor:
Thaddeus S. Leese
by C. M. Clark
his Attorney

No. 12,318. REISSUED FEB. 14, 1905.

T. S. LEESE.

LAMP.

APPLICATION FILED JAN. 5, 1905.

3 SHEETS—SHEET 2.

Witnesses:

E. R. Rodd.

Chas. S. Sipley

Inventor:

Thaddeus S. Leese by A. M. Clark his attorney

No. 12,318. REISSUED FEB. 14, 1905.
T. S. LEESE.
LAMP.
APPLICATION FILED JAN. 5, 1905.
3 SHEETS—SHEET 3.
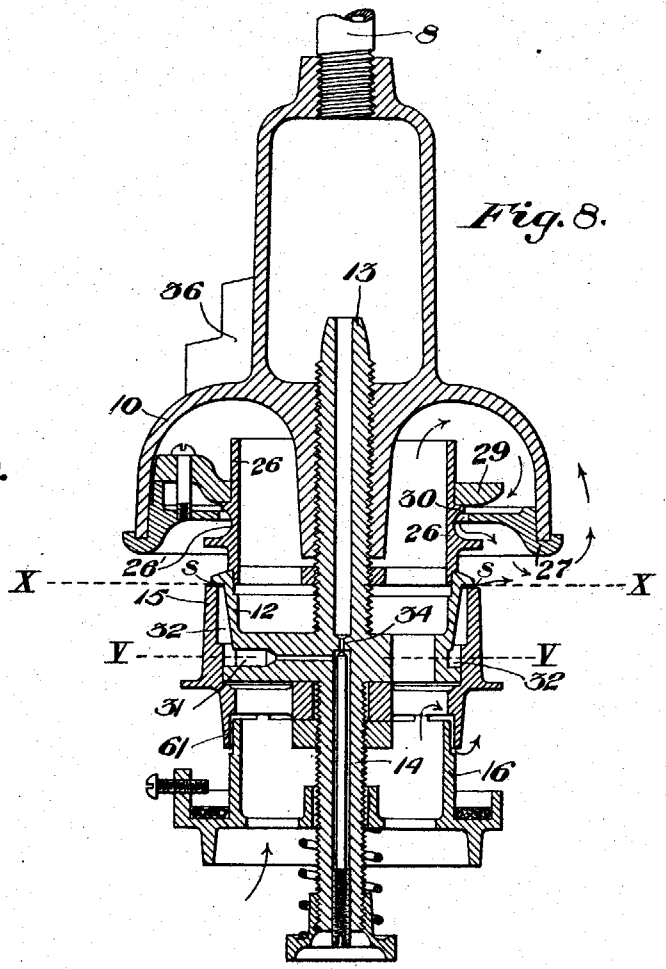
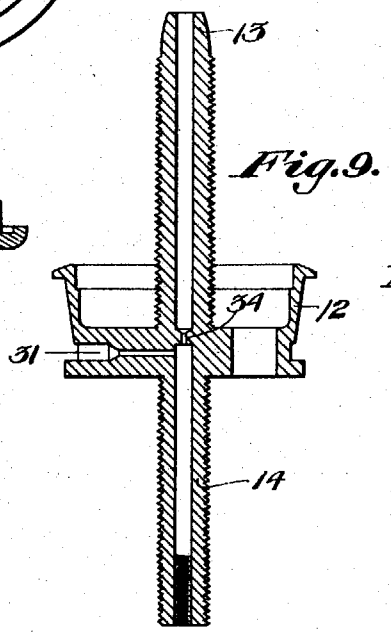
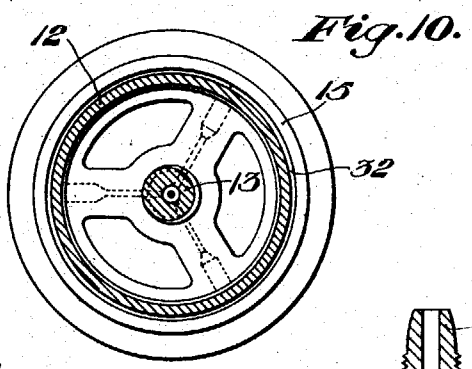
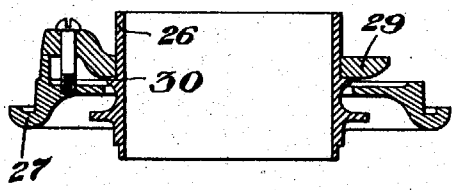
Witnesses:
E. R. Rodd
Chas. S. Fepley
Inventor:
Thaddeus S. Leese
by C. M. Clarke
his attorney.

No. 12,318. Reissued February 14, 1905.

UNITED STATES PATENT OFFICE.

THADDEUS S. LEESE, OF BELLEVUE, PENNSYLVANIA, ASSIGNOR TO PITTSBURG LIGHT & MANUFACTURING COMPANY, OF ALLEGHENY, PENNSYLVANIA, A CORPORATION OF PENNSYLVANIA.

LAMP.

SPECIFICATION forming part of Reissued Letters Patent No. 12,318, dated February 14, 1905.

Original No. 746,637, dated December 8, 1903. Application for reissue filed January 5, 1905. Serial No. 239,825.

*To all whom it may concern:*

Be it known that I, THADDEUS S. LEESE, a citizen of the United States, residing at Bellevue, in the county of Allegheny and State of Pennsylvania, have invented certain new and useful Improvements in Lamps, of which the following is a specification, reference being had therein to the accompanying drawings.

This invention relates to certain new and useful improvements in lamps, and relates more particularly to that class of lamps which are designed to burn natural gas and to mix therewith a predetermined quantity of superheated air, the point at which the gas and superheated air unite being the point at which combustion will take place.

The object of this invention is to provide a lamp wherein the air and gas may be suitably heated before combustion and to so arrange the parts that the air-supply will be constant under all conditions of the outside atmosphere.

A further object is to provide a transparent protecting outer shield around the globe of the lamp.

A still further object of this invention is to so arrange and design the parts that the same may be readily constructed and assembled and that a perfect adjustment of the different elements of the lamp may be obtained.

A still further object of this invention is to provide the air-inlet to the lamp with suitable means whereby no matter in what direction or at what velocity the air-currents may be directed the inlet to the burner will receive a predetermined amount of air without any sudden changes or perceptibly-uneven conditions.

In describing the invention in detail reference is had to the accompanying drawings, forming a part of this specification, in which—

Figure 2:
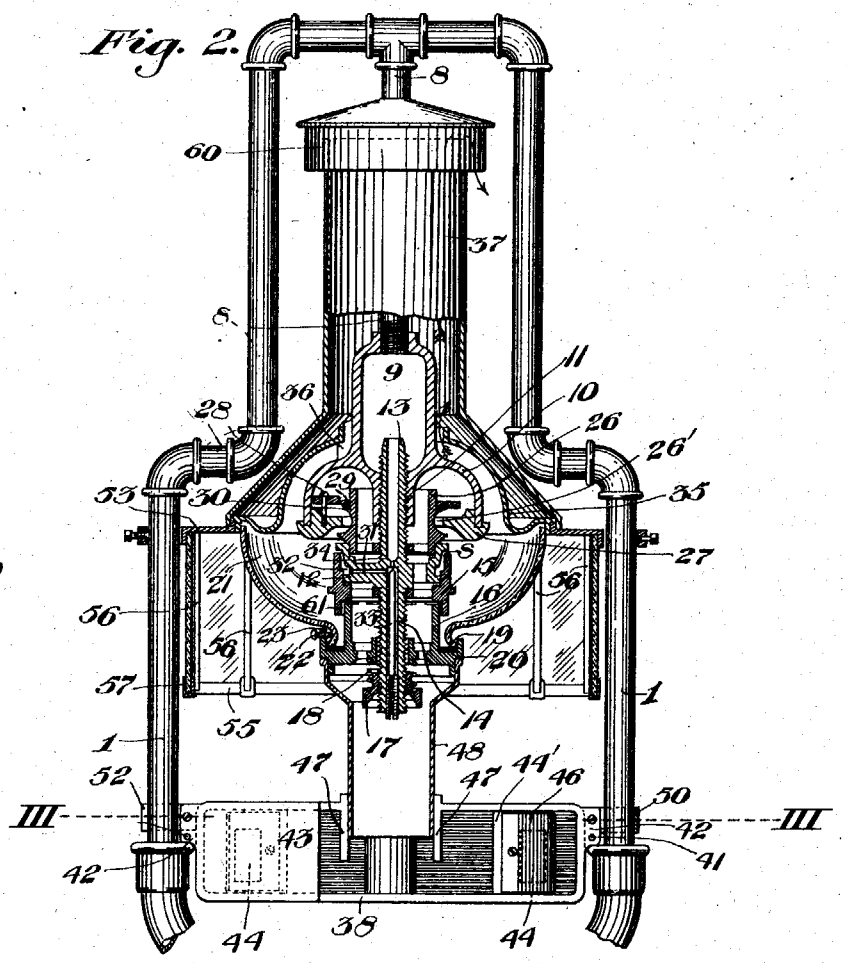
Figure 1:
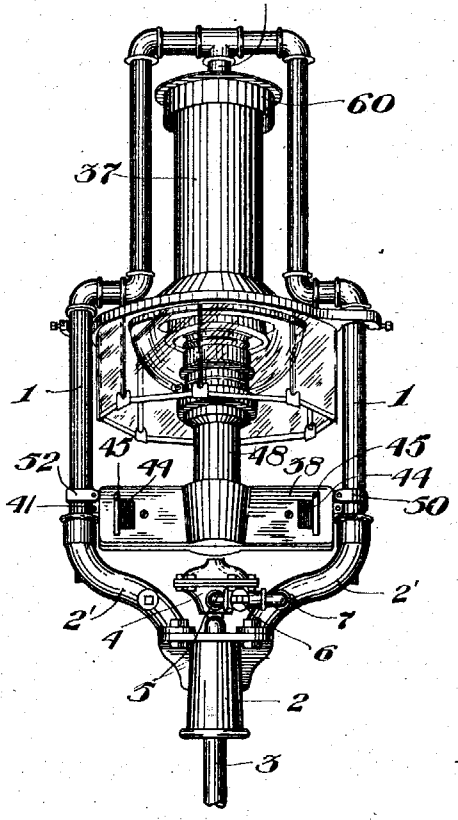
Figure 3:
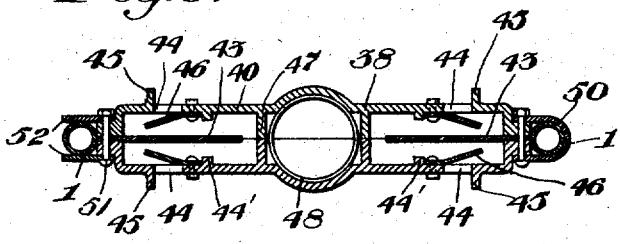
Figure 4:
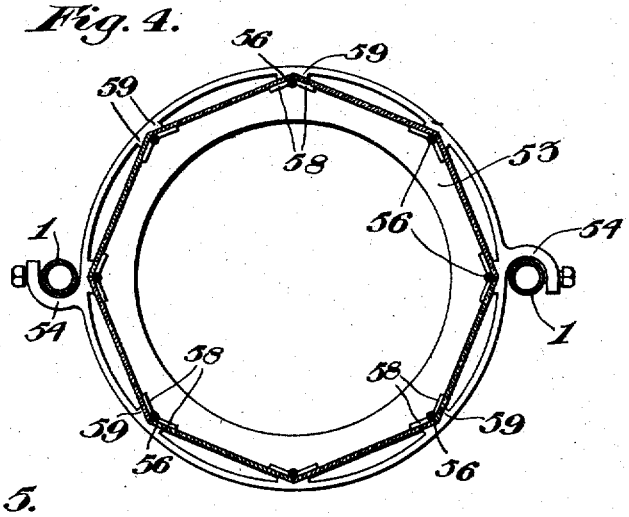
Figure 5:
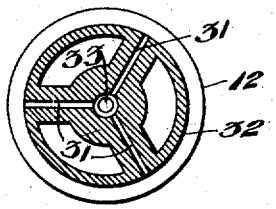
Figure 6:
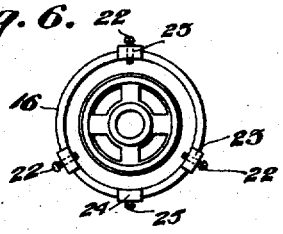
Figure 7:
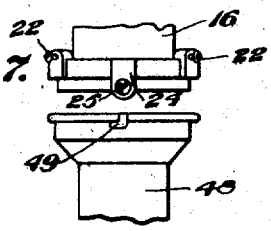

Figure 1 is a detail perspective view of my improved lamp. Fig. 2 is a side elevation, on an enlarged scale, partly in section. Fig. 3 is a sectional plan view of the air-inlet chamber on the line III III of Fig. 2. Fig. 4 is an inverted plan view of the ring on which the lights forming the outer shield are secured. Fig. 5 is a sectional plan view of the gas-inlet ring on the line V V of Fig. 8. Fig. 6 is a plan view of the globe-holder. Fig. 7 is a side elevation of the same, showing the air-inlet funnel detached therefrom. Fig. 8 is an enlarged vertical sectional view of the working portions of the lamp. Fig. 9 is a sectional detail view of the burner-ring detached. Fig. 10 is a horizontal section on the line X X of Fig. 8. Fig. 11 is a sectional view of the partition-ring and its connected deflector-ring detached.

The reference-numeral 1 indicates a supporting-frame of pipe upon which the different portions of the lamp are secured, and 2 is a base-casting of this supporting-frame. The gas-inlet pipe 3 leads through a suitable regulating-valve 4, and a pipe 5 connects said valve with one of the hollow members 2′ of the base 2, whereby the gas may be conducted to one side of the frame 1 and thence to the burner of the lamp. Interposed in this pipe 5 is a by-pass valve 6, and an auxiliary valve 7 is interposed in said pipe for the purpose of permitting the regulation of the gas when the same is under an extra high pressure. The gas being admitted to the pipe 3, regulator 4, and pipe 5 to one side of the frame 1 is conducted by pipe 8 to the gas-heating chamber 9, the lower outer portion of which is bell-shaped, as indicated at 10, and the interior of this bell portion has provided therein a central projection 11, the interior of which is screw-threaded. 12 is the burner-ring, which has a hollow screw-threaded projection 13 on its upper side, adapted to be screwed into said projection 11. The lower end of this burner-ring 12 has formed thereon a screw-threaded projection 14, and an outer ring 15 is mounted thereon, as clearly shown in Fig. 2. A globe-holder 16 has a hub at its center, which slips over projection 14, and a screw-threaded nut 17 holds the same in its upper position by means of a spring 18 interposed between said hub and nut. The upper end of this globe-holder is recessed, as at 19, and a washer 20, which may be made of asbestos or other suitable material, is placed therein, and the globe 21 rests thereon and is suitably secured in said ring by screws 22 22 22, which are mounted in lugs 23 23 23, formed on the upper side of said ring. A lug 24 is also provided on said ring and has a screw 25 passing therethrough for a purpose to be more fully hereinafter described.

Mounted upon the projection 13 on the upper side of the burner-ring 12 is a partition-ring 26, having on its outer side an annular concave groove 26′, and a ring 27, on the upper side of which a groove is formed and partially closes the lower end of the bell 10.

29 is an annular flange-ring, supported on shoulder 30 of partition-ring 26, extending out beyond groove 26′ and supporting by screws 28 the ring 27, which is thus held up tightly against the bell 10.

The burner-ring 12 has leading from its central aperture a plurality of gas-outlet ports 31, which lead to the annular recess 32, formed between the burner-ring and outer ring 15. The outer ring 15 is secured up tightly against the bottom of burner-ring 12 in any convenient manner, providing a narrow annular intervening slot *s*, through which the gas escapes from annular space 32.

A needle-valve 33, the outer end of which is screw-threaded, operates in projection 14 and is adapted to seat against the contracted opening 34, formed in said central aperture, by which means the amount of gas which may be permitted to pass through the several outlet-openings 31 and slot *s* may be regulated within said lamp.

A bell-shaped cap 35 is placed over the outer side of the bell 10 and is supported by lugs 36, formed on said bell. The passage thereby formed between the cap 35 and bell 10 forms an outlet for the products of combustion within said lamp, and these passing around the bell 10 and chamber 9 during their exit will heat said chambers, and the temperature of any gases or air contained within said parts will thereby be materially raised. A suitable casing or shell 37 completely covers these outside parts in order that the same may not be affected by the atmospheric conditions. The air-inlet for the lamp may be directly up through the hollow globe-holder 16 from the outside atmosphere or, if the lamp is exposed, through the air-inlet and baffling chamber 38, the construction of which is as follows: The chamber is formed of two side pieces 39 40, which are adapted to be secured together by suitable screws 41, which pass through lugs 42, formed on either end thereof, and plates 43, forming partition-walls, are secured between said parts when the same are secured together. Inlet-openings 44 are formed in the outer side walls of each member of the chamber, and a web or projection 45 is formed on the outer edge of said apertures, as shown in Fig. 3. Deflector-plates 46 are secured within the chamber and are inclined or otherwise arranged to extend outwardly and slightly beyond the openings 44. These plates 46 have their rear edge resting against a lug 44′, formed within the members of the chamber, and are secured in position by a screw. The projections 47 are also provided in this chamber adjacent to their center, forming walls which project down only a portion of the depth of said chamber, as seen in Fig. 2, and the central portion of said chamber is enlarged, and an air-inlet funnel 48, which fits snugly therein, is adapted to be vertically moved, and thereby connect or disconnect the air-inlet chamber with the lamp-burner. The upper end of this funnel 48 is connected to the globe-support by a bayonet connection 49, which is engaged by the screw 25, mounted in said globe-support, as before mentioned.

Referring to Fig. 3, it will be seen that the air blowing in any direction will not be permitted to pass directly to the burner, it being necessary for said air to pass around plates 46 43, under projections 47, and up through the funnel 48, the air being thereby deflected and baffled. At the same time the projections 45, formed on the outside of the chamber, will arrest and cause a certain amount of air to pass within the chamber in whatever direction the same may be moving. By this arrangement it has been found that the baffling effect of the different plates prevents sudden differences within the burner, and at the same time the projections 45 insure the proper amount of air always entering said chamber, thereby producing an even air-supply to the burner. This chamber is suitably secured in place by a strap 50, attached to a lug on one end thereof by a bolt, said strap passing around one arm of the frame, and by this means a pivotal connection is formed between said frame and chamber, thereby allowing a horizontal movement of the chamber. The other end of the chamber has pivotally connected thereto by a bolt 51 the plates 52, which are adapted to lie one on either side of the other arm of the frame, thereby retaining it in a locked position and preventing the displacement of the chamber until such time as the plates 52 have been moved to a position to permit the chamber to be swung around. It will of course be evident that when this chamber is to be moved the funnel 48 must be disconnected and lowered away from the globe-support. The ring 53, on which the outer shield is secured, is connected to the frame 1 by the oppositely-disposed arms 54, formed on said ring, which are provided with set-screws for this purpose. The outer shield consists of a plurality of pieces of glass or other transparent material, the under edges of which rest in the annular support 55, the said support being held by the vertical rods 56 and the clips secured thereto. The upper ends of these rods are secured in the ring 53. The upper sides of the shield are supported at their adjoining edges by the lugs 58 on the inside and lugs 59 on the outside. The upper end of the shield 37 may be provided with any suitable form of wind-guard, as indicated at 60.

The operation of this lamp will be as follows: The air-currents moving in any direction would enter through one or more of the ports 44, pass around plates 46, against plates 43, under the projections 47, up through the funnel 48, through suitable apertures formed in the globe-support 16, through apertures formed in the ring 15, through the burner-ring 12, through apertures formed in the ring 26, and into the heating-chamber formed within the bell 10. The air will then pass in a serpentine course between the ring 27 and ring 26 at the point where the concave groove 26′ is formed and downwardly and outwardly underneath the rounded lower periphery of ring 27, where it is mixed with the gas and combustion takes place. By this means a film of heated air always intervenes between the ring 27 and the film of gas coming from the emission-slot *s*, thereby preventing any deposit of carbon on the exposed parts.

It will be noted that a small amount of air is permitted to pass between rings 15 16, through passages indicated by 61, for the purpose of permitting sufficient air within the globe 21 and below the film of gas to insure the proper combustion. The gas flows from chamber 9 down through hollow projection 13, through the needle-valve-controlled opening therein, and through ports 31 to the annular chamber 32, formed between the rings 12 and 15, which form the burner, where it would pass into the globe 20, mixing with the air which, as above described, is entering therein, and, as before stated, the combustion would then take place. It will be further noted that should an excess amount of air or gas, or both, be permitted to flow through said burner the resultant undue combustion and the free carbon consequent thereon would not in any way affect the different inlet-ports of the lamp, as the outlet for the products of combustion is entirely beyond the inlet-ports.

Having fully described my invention, what I claim as new, and desire to secure by Letters Patent, is—

1. In combination with the supporting-frame, a burner, and means for admitting air to the burner including an air-inlet chamber having its walls formed with openings, and plates arranged in inclined position over said openings.

2. In a lamp of the type set forth, in combination with the supporting-frame, an air-inlet chamber formed in sections secured to said frame, said sections being formed with openings, and plates arranged in said chamber between said openings.

3. The combination with a regenerative lamp, of an air-baffling device comprising a separate detachable chamber communicating with the burner and provided with air-entrance openings and cover-plates arranged across said openings so as to deflect the incoming air and cause it to follow a tortuous course, substantially as set forth.

4. In a lamp, the combination of a burner, a gas-passage connected thereto, an air-passage connected therewith, the outer end of said air-passage being in the form of an enlarged chamber, said chamber being provided with a plurality of air-inlet apertures, projections adjacent to said apertures on the outside of said chamber, angular deflector-plates over said apertures within said chamber, and walls within said chamber whereby the air passing through the same makes a circuitous route, thereby regulating the amount of air admitted to the burner irrespective of the atmospheric conditions, substantially as described.

5. In a lamp, the combination of a burner, a gas-passage leading thereto, an air-passage connected therewith, said air-passage having its outer or inlet end formed as a chamber, means within said chamber for regulating the amount of air admitted to the burner irrespective of the atmospheric conditions, mountings for said chamber whereby the same may be moved horizontally, a locking means for securing the same in its operative position, and a sliding connection between said chamber and burner whereby the same may be disconnected, substantially as described.

6. In a lamp, the combination of a frame, a burner suspended within said frame, a portion of said frame forming a gas-passage leading to said burner, a chamber rotatably secured within the frame, a detachable connection between said chamber and burner, and means within said chamber for regulating the amount of air admitted to said burner irrespective of the atmospheric conditions.

7. In a lamp, the combination of a vertically-oblong frame, a burner suspended within said frame, a portion of said frame forming a gas-passage leading to said burner, means for regulating the amount of gas admitted to said burner irrespective of the initial gas-pressure, an air-inlet chamber pivotally suspended within the frame, walls within and projections without said chamber whereby the air admitted to the burner is controlled irrespective of the atmospheric conditions, and a detachable connection between said chamber and burner, substantially as described.

8. In a lamp, the combination of a frame, a burner suspended within said frame, a portion of said frame forming a gas-inlet passage leading to the burner, an air-inlet chamber pivotally connected to one arm of said frame, a lock provided on the other end of said chamber adapted to engage the other arm of said frame, walls and plates within and projections without said chamber whereby the amount of air admitted to the burner is regulated, and a detachable connection between said chamber and the burner, substantially as described.

9. In a lamp, the combination of a frame, a portion of said frame forming a gas-inlet, a gas-chamber connected to said frame, a burner-ring suspended from and connected to said chamber, a globe-support flexibly mounted on a projection formed on said ring, a bell suspended without said gas-chamber, an air-inlet chamber pivotally connected to one arm of the frame, a lock mounted on said chamber adapted to engage the other arm of said frame, plates and walls within and projections without said chamber whereby the amount of air passing through the same is regulated irrespective of the atmospheric conditions, and a detachable connection between said chamber and parts constituting the burner whereby said chamber may be disconnected from the same, substantially as described.

10. In a lamp, the combination of a hollow frame, a portion of said frame forming a gas-inlet passage to the burner, a gas-chamber connected with said frame, a burner-ring connected with said gas-chamber, a lower extension of the gas-chamber being enlarged and forming a heating-chamber for the air, a bell-shaped cap mounted without said chamber providing an outlet-passage for the products of combustion, a flexibly-mounted globe-support beneath said burner-ring, a ring on which a transparent outer shield is suspended, detachable connections between said ring and the frame, a chamber pivotally suspended within said frame beneath said burner, plates and walls within and projections without said chamber, whereby the amount of air passing through the same is regulated irrespective of the atmospheric conditions, and a detachable connection between said chamber and the passage leading to the air-chamber, substantially as described.

11. In a device for producing light from gas, the combination of a hollow frame, a gas-chamber mounted within said frame, said chamber being connected with a gas-supply, a pressure-regulating valve connected in said gas-supply, an enlarged projection on the lower end of the gas-chamber forming an air-heating chamber, a burner-ring connected with said gas-chamber, a needle-valve within said burner-ring for regulating the amount of gas passing to the same, a globe-support flexibly mounted on a projection formed on the under side of said burner-ring, an air-passage formed within said globe-support, a chamber pivotally suspended within the frame, projections without and plates and walls within said chamber which control the quantity of air passing through the same irrespective of the atmospheric conditions, a detachable connection between said chamber and globe-support, a ring detachably connected with the frame, and a transparent outer shield suspended from said ring, substantially as described.

12. A burner consisting of a cylindrical burner-ring, a surrounding ring providing an intervening annular space and a horizontally-disposed circular emission-slot, means for introducing gas to said annular space, and means for supplying a film of heated air above said emission-slot to combine with the gas issuing therefrom, substantially as set forth.

13. A burner consisting of a cylindrical burner-ring, a surrounding ring providing an intervening annular space and a circular emission-slot, means for introducing gas to said annular space, means for supplying a film of heated air above said emission-slot to combine with the gas issuing therefrom, with a superimposed ring having a downwardly-projecting rounded rim located upwardly and outwardly beyond said emission-slot, and means providing for escape of the products of combustion, substantially as set forth.

14. In a burner, the combination with a gas-heating chamber, of a hollow stem provided with an annular flanged burner-ring, a surrounding cylindrical casing providing an intervening annular space and a circular gas-emission slot, ports communicating with the central gas-passage and said annular space, a valve mounted in the burner-stem adapted to control the flow of gas, a superimposed ring having a downwardly-projecting rounded portion encircling the burner above and outwardly beyond the emission-slot, and means providing a circulation of heated air so as to combine with the gas in combustion immediately below said rounded ring, substantially as set forth.

15. In a burner, the combination with a gas-heating chamber, of a hollow stem provided with an annular flanged burner-ring, a surrounding cylindrical casing providing an intervening annular space and a circular gas-emission slot, ports communicating with the central gas-passage and said annular space, a valve mounted in the burner-stem adapted to control the flow of gas, a superimposed ring having a downwardly-projecting rounded portion encircling the burner above and outwardly beyond the emission-slot, means providing a circulation of heated air so as to combine with the gas in combustion immediately below said rounded ring, and means providing for escape of the products of combustion, substantially as set forth.

16. In a burner, the combination with a gas-heating chamber provided with a downwardly-extended flaring bell and a surrounding cap, of a burner-ring having a centrally-disposed hollow stem connected with the gas-heating chamber, ports leading therefrom to the exterior of the burner-ring, a gas-controlling valve, a surrounding shell providing an intervening annular space and a gas-emission slot, a hollow globe-supporting ring, a globe supported thereby, a superimposed ring having an annular downwardly-extending rounded periphery located upwardly and outwardly beyond said emission-slot, and means providing a circulation of heated air through the interior of the burner structure adapted to discharge the air outwardly above the emission-slot and below said superimposed ring, substantially as set forth.

17. The combination with a main supporting-frame and a lamp carried thereby, of an annularly-arranged supporting-frame surrounding the lamp and secured upon the main frame provided with a series of downwardly-depending supporting-arms and an annular bottom-carrier, with a series of transparent panes mounted in said carrier, substantially as set forth.

18. The combination with a main supporting-frame and a lamp carried thereby, of an annularly-arranged supporting-frame surrounding the lamp and secured upon the main frame provided with a series of downwardly-depending supporting-arms and an annular bottom-carrier, with a series of transparent panes mounted in said carrier, with devices incorporated with the carrier adapted to engage the meeting edges of the panes and to hold them in position, substantially as set forth.

In testimony whereof I affix my signature in the presence of two witnesses.

THADDEUS S. LEESE.

Witnesses:
C. M. CLARKE,
JAS. J. MCAFEE.